US006954712B2

(12) United States Patent
Bingham et al.

(10) Patent No.: US 6,954,712 B2
(45) Date of Patent: Oct. 11, 2005

(54) MULTI-MODE SCSI DIAGNOSTIC TOOL, SYSTEM, AND METHOD

(75) Inventors: Robert LaMar Bingham, Vail, AZ (US); Jeremy Andrew Cohn, Tucson, AZ (US); Kamal Emile Dimitri, Tucson, AZ (US); Hector E. Mery, Tucson, AZ (US); Daniel Scott Moore, Tucson, AZ (US); Robin Daniel Roberts, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 193 days.

(21) Appl. No.: 10/404,707

(22) Filed: Apr. 1, 2003

(65) Prior Publication Data

US 2004/0199353 A1 Oct. 7, 2004

(51) Int. Cl.[7] .............................................. G01M 19/00

(52) U.S. Cl. ...................... 702/123; 702/122; 702/115; 714/30; 714/43

(58) Field of Search ................................ 702/123, 115, 702/122; 714/30, 42, 43, 224; 324/71.1

(56) References Cited

U.S. PATENT DOCUMENTS

| | | | | |
|---|---|---|---|---|
| 5,361,346 A | * 11/1994 | Panesar et al. | ............... | 714/42 |
| 6,067,506 A | 5/2000 | Goldys et al. | .............. | 702/117 |
| 6,256,695 B1 | 7/2001 | Williams | .................... | 710/107 |
| 6,341,358 B1 | * 1/2002 | Bagg et al. | .................... | 714/43 |
| 6,353,865 B1 | 3/2002 | Kiryu et al. | ................ | 710/101 |
| 6,378,025 B1 | 4/2002 | Getty | ......................... | 710/300 |
| 6,889,166 B2 | * 5/2005 | Zielinski et al. | ............ | 702/183 |

OTHER PUBLICATIONS

SCSI–1, The PC Guide, Apr. 17, 2001, Charles M. Kosierok.*

SCSI–2, The PC Guide, Apr. 17, 2001, Charles M. Kosierok.*

* cited by examiner

*Primary Examiner*—Michael Nghiem
*Assistant Examiner*—Stephen J Cherry
(74) *Attorney, Agent, or Firm*—Kunzler & Associates

(57) ABSTRACT

An apparatus, system and method for testing a peripheral device such that the device can remain installed in a housing and connected to a communication bus such as a SCSI bus. The apparatus, system, and method include a communication port that is connectable to a peripheral device connected to a terminated communication bus. The communication port is connected to a first transceiver and a second transceiver. A microcontroller is also connected to the first transceiver and the second transceiver. The microcontroller is programmed to detect an operation mode for the peripheral device and selectively activate the first transceiver or the second transceiver based on the detected operation mode. The microcontroller is further programmed to perform a logical diagnostic test on the peripheral device using the activated transceiver. A user interface is included to communicate to a user a result of the diagnostic test.

9 Claims, 6 Drawing Sheets

MULTI-MODE SCSI DIAGNOSTIC TOOL, SYSTEM, AND METHOD

BACKGROUND OF THE INVENTION

1. The Field of the Invention

The invention relates to devices, methods, and systems for diagnosing peripheral devices. Specifically, the invention relates to devices, methods, and systems for diagnosing a peripheral device connected to a terminated SCSI bus operating in one of a plurality of operating modes.

2. The Relevant Art

Computer peripheral devices are widely used. Generally, a basic computer system includes a processor and temporary storage such as Random Access Memory (RAM). Peripheral devices are all other devices that are added to enhance the capabilities of the computer system. The peripherals may be internal or external to the computer system. Examples of peripheral devices include hard disks, tape drives, CD-ROMS, CDRW, scanners, printers, and the like.

The computer system communicates with the peripherals by way of an adapter that connects to a system bus of the computer system. Generally, the adapter is contained on a printed circuit board that fits in a slot of a motherboard of the computer system. Alternatively, the adapter may be integrated in the motherboard of the computer system.

Generally, a plurality of peripherals communicate with the computer system over a common communications bus using a common communications protocol. Examples of communications buses include Integrated Drive Electronics (IDE), Enhanced Integrated Drive Electronics (EIDE), and the like. One popular communications bus and protocol is the Small Computer System Interface (SCSI).

While any peripheral device may be configured to use almost any communications protocol, the intended use for the peripheral generally influences the communications protocol used. For instance, certain peripherals are better suited to certain communications protocols than others. Generally, the protocol selected is directly related to the amount of data that will be transferred between the computer system and the peripheral. Basic I/O devices such as keyboards and mice may work well using the relatively slow Universal Serial Bus (USB) protocol. Other devices such as hard disks and tape drives may be configured to use the faster SCSI protocol.

Conventional SCSI protocols are capable of transferring data at rates of between about 40 Mbytes/sec to about 160 Mbytes/sec. These high data transfer speeds are desirable for moving large amounts of data, such as when performing a backup or restore operation on a disk drive.

FIG. 1 illustrates a conventional SCSI system 100. Generally, SCSI devices are external peripherals that are connected by SCSI cables to a host computer system 102. The SCSI protocol supports a comparatively long distance between peripherals. Cable lengths may currently be as long as eighty-two feet.

The SCSI protocol is a bus topology. This means that peripherals can be added or removed in a "daisy-chain" fashion. To add a new peripheral 104, a cable is simply connected between the host system 102, or another SCSI peripheral, and the new peripheral 104.

The collection of cables 106 connecting one SCSI device to another is referred to as a SCSI bus 108. As referred to hereinafter, the term "SCSI device" refers to any device that is connectable to a SCSI bus 108 and that is capable of communication with another SCSI device over the SCSI bus 108. The SCSI protocol requires that the SCSI bus be terminated. This means that at each end of the SCSI bus, a terminator 110 is connected. Termination of the SCSI bus ensures that electrical signals passed on the wires of the SCSI cables 106 are not reflected back down the wires. Reflection can cause signals passed on the wires to become indiscernible by connected SCSI devices.

Generally, a terminator 110 is a device adapted to connect to a SCSI cable or SCSI port of a SCSI device. The terminator 110 includes a series of resisters that absorb electrical signals passed on the wires of the SCSI cable. In certain implementations, the terminator 110 provides about seventy-five ohms of resistance. Alternatively, the terminator 110 may be implemented in software, integrated into a SCSI adapter in the host computer 102, or integrated into a peripheral 104. An internal terminator may be activated by software, firmware, jumpers, or the like.

To accommodate daisy-chain connections and terminators 110, SCSI devices generally include at least two communication ports (hereinafter 'ports' or 'communication ports') for connecting to SCSI cables 106 or terminators 110. Consequently, each SCSI device on the ends of the SCSI bus 108 has one port connected to a SCSI cable 106 and the other port connected to a terminator 110, unless the device provides an integrated terminator. SCSI devices in the middle of the SCSI bus 108 generally includes a SCSI cable 106 connected to each communications port.

The SCSI protocol allows any two SCSI devices connected to the SCSI bus 108 to communicate at any given time. The SCSI device issuing SCSI commands is known as the "initiator," and the SCSI device that is intended to perform the SCSI commands is known as the "target". Generally, the host computer 102 is the initiator because it issues SCSI commands to each of the SCSI devices.

Each SCSI device is assigned a unique SCSI identifier (SCSI ID). The number of SCSI IDs determines the number of SCSI devices that may be connected at one time on the SCSI bus 108. The SCSI ID may be set manually using a thumb-wheel, a DIP switch, a jumper, or the like. Alternatively, the SCSI ID may be set using programmable memory for the SCSI device. Generally, depending on the type of SCSI bus 108, eight or sixteen SCSI devices may be connected to a SCSI bus 108.

Referring still to FIG. 1, a typical SCSI bus 108 may allow for sixteen SCSI devices, including the adapter in the host system 102. In one common configuration, for instance, a series of tape drives 112 may be connected by cables 106 to the SCSI bus 108. The tape drives 112 may be organized into a tape library 114 for convenience. The last tape drive 112 is terminated by a terminator 110.

The SCSI protocol provides a comparatively fast protocol for transferring data between peripherals such as hard disks and tape drives. The SCSI protocol is very flexible, because peripherals may be readily added to or removed from the SCSI bus 108. In addition, the data is transferred across the SCSI bus 108 with high reliability.

Unfortunately, setting up a SCSI system 100 that is similar to the one described in FIG. 1 and that provides a desired data transfer rate is not simple. The SCSI protocol has been available for many years. As hardware technology has advanced, the SCSI protocol has been updated. Updating the SCSI protocol has resolved certain hardware limitations, but introduced others.

The SCSI protocol allows the SCSI devices and SCSI bus 108 to operate according to operation modes. An operation mode is a method for placing signals on the wires of the SCSI cables 106. The first operation mode was single-ended (SE). In the SE operation mode, each signal wire is driven against ground. The SE operation mode suffers from noise interference and does not allow for lengthy cables 106. Generally, SE allows for cable lengths between about five feet and about twenty feet.

To overcome the cable length limits of SE, the High Voltage Differential (HVD) operation mode was developed. HVD drives two signal wires. One wire is driven with a signal that is inverse to the other wire. The difference in the signals between the two wires represents the SCSI signal. The HVD operation mode is less affected by noise. In addition, the cable length may be as long as eighty-two feet and still maintain reliable data transfers.

Eventually, the SCSI protocol was again revised to increase the data throughput for the protocol. In order to increase the throughput, the voltage level for the protocol was changed from about 5 volts to about 3.3 volts. The new operation mode was named Low Voltage Differential (LVD). LVD operates in a similar fashion to HVD, except for the difference in voltage levels. LVD retains the advantages over noise and the longer cable lengths. In addition, LVD uses less voltage and current, so, less heat is produced. This meant that LVD may be implemented in Integrated Circuits (ICs). Consequently, the LVD compatible SCSI devices are more reliable.

As the SCSI protocol has been revised and updated, efforts have been made to provide backward compatibility. This is important because peripherals 104 such as large hard drives and tape libraries 114 are expensive and not easily replaced with each new SCSI protocol update. To provide backward compatibility, the SCSI protocol includes a multimode LVD or Multimode Single Ended operation mode (LVD/MSE). LVD/MSE operation mode allows the SCSI system to revert to the lowest common denominator connected to the SCSI bus 108. So, if an LVD/MSE SCSI device is connected to a SE SCSI bus 108, the SCSI device operates according to the SE operation mode. Similarly, if a SE device is connected to a LVD/MSE SCSI bus 108, the entire SCSI bus 108 operates according to the SE operation mode. Generally, this means that the data throughput is reduced by about fifty percent. Because of this capability, most LVD devices and cables 106 are LVD/MSE. Consequently, references hereinafter to LVD refers to LVD/MSE devices.

Unfortunately, HVD is not compatible with SE or LVD. This means that if you have a mismatch between operation modes on the SCSI bus 108, with the terminators 110, or with the SCSI devices between HVD and SE or LVD, the SCSI system 100 will not function properly. Either the SCSI device will fail to respond or signals may not be properly transferred across the SCSI bus 108.

As the operation modes have changed, the cables 106 have been changed as well. Changing the cables 106 may require changing the communication ports on the SCSI devices. For backward compatibility, however, cables 106 operating under new operation modes may include connectors that connect to the old communication ports. This means that determining the operation mode for the cable 106 may be difficult. In addition, adapters may further complicate the ability to discern which operation mode is being used in the SCSI system 100. The connectors typically comprise either fifty or sixty-eight pins.

A SCSI cable 106 is a bundle of wires. In certain instances, the same cable 106 may be used in different operation modes. As the operation mode changes, the purpose of each wire may change. In other words, the pin-out changes based on the operation mode being used.

Furthermore, different size cables 106 may be used to support different data throughput. Generally, SCSI cables 106 have either an 8 bit bus or a 16 bit bus. An 8 bit bus has at least 8 wires for carrying data signals. The number of wires is doubled when LVD operation mode is used. The different cable sizes and different versions of the SCSI protocol has lead to a variety of names for the type of SCSI system being used. Names such as SCSI-1, Fast SCSI, Ultra SCSI, Ultra2 SCSI, Fast Wide SCSI, Wide Ultra SCSI, Wide Ultra2 SCSI, Ultra3 SCSI, and Ultra320 SCSI, are just a few of the different names used to describe the configuration of a SCSI system. Consequently, keeping track of the current operation mode and type of SCSI system that is implemented can be difficult.

Troubleshooting errors in a SCSI system 100, such as that illustrated in FIG. 1, can be very difficult. Assuming the SCSI system is properly configured to begin with, and that the technician understands the complexities described above for a particular SCSI system 100, the SCSI system may stop working for a variety of reasons. For example, a user may install a cable 106 or SCSI device configured to operate under an incompatible operation mode. Alternatively, a terminator 110 for the wrong operation mode may be installed. Also a terminator 110 may have been left off of one end of the bus 108. A single cable 106 may have a break in one or more wires internal to the cable 106, or one of the SCSI devices may have failed.

Logical errors may occur in the SCSI system 100 as well. For example, a SCSI device may be installed with the same SCSI ID as a SCSI device already connected to the SCSI bus 108. Logical errors and physical configuration errors in a SCSI system 100 may not be readily apparent, and the errors may surface unexpectedly.

Isolating a problem in the SCSI system 100 is difficult, because as each SCSI device connected to the SCSI bus 108 is checked, the number of SCSI cables 106, terminators 110, and SCSI devices between the SCSI device and the host 102 that may be a source of the problem increases rapidly. Furthermore, logical errors such as duplicate SCSI IDs may only be identified by physically inspecting the thumb-wheel or jumpers of each SCSI device. Alternatively, all the SCSI devices may be powered down and each brought on-line independently so that the SCSI ID's of the devices may be verified.

Unfortunately, few tools exist for testing each SCSI device and the SCSI bus 108, including terminators 110, between a tested SCSI device and the host computer 102—independent of influences from other SCSI devices. Certain tools exist that test for transmission of electrical signals along the lines of SCSI cabling. These tools, however, fail to provide a logical test of the operation of a SCSI device to test for problems such as a duplicate SCSI ID. Conventional testing devices are configured specific to the operation mode for the SCSI system. This means that several testing devices must be made available to accommodate the proper operation mode.

Using conventional testers and techniques, a technician often narrows the problem down to one or two suspect SCSI devices. Generally, resolving the problem requires that these SCSI devices be removed from the SCSI bus 108 and shipped to a manufacturer for independent hardware analysis to determine whether the SCSI devices have failed. If one of the suspect devices is a tape drive 112 in a tape library 114, removing and shipping the tape drive 112 can be very costly, particularly if it turns out that the tape drives 112 is not the source of the problem failure.

Accordingly, what is needed is an apparatus, system, and method that overcome the problems and disadvantages mentioned above. To be most effective, the apparatus, system, and method should allow for testing of each SCSI device connected to the SCSI bus independently and without physically removing the SCSI device. Also, the apparatus, system, and method should automatically adapt to the operation mode, LVD/SE or HVD, for the SCSI device being tested; and the apparatus, system, and method should test the integrity of portions of the SCSI bus connected to the SCSI device being tested, including any terminators currently connected to the SCSI device or the SCSI bus. In addition, such an apparatus, system, and method to be most effective should not provide any artificial termination. Likewise, the apparatus, system, and method should be able to conduct logical tests on the SCSI device to determine electrical integrity for the SCSI bus as well as logical operation of the SCSI device. The apparatus, system, and method should also provide convenient feedback regarding whether or not an error condition exists for the SCSI device.

SUMMARY OF THE INVENTION

The various elements of the present invention have been developed in response to the present state of the art, and in particular, in response to the problems and needs in the art that have not yet been fully solved by currently available SCSI diagnostic tools. Accordingly, the present invention provides an improved apparatus, method, and system for a multi-mode SCSI diagnostic tool.

In one embodiment, an apparatus for testing a peripheral device includes a communication port that is connectable to a peripheral device. Preferably, the communication port connects directly to a corresponding communication port of the peripheral device. Alternatively, an adapter may be used to connect the communication port to the peripheral device.

The apparatus in one embodiment includes a first transceiver and a second transceiver connected to the communication port. Preferably, the first transceiver is configured to send and receive signals through the communications port using an operation mode such as HVD. The second transceiver is configured to send and receive signals through the communications port using an operation mode such as LVD/SE.

A logical device such as a microcontroller connected to the communication port is programmed to detect the operation mode for the peripheral device and activate the first transceiver or the second transceiver based on the detected operation mode. For example, if the microcontroller detects that the operation mode is LVD/SE, the second transceiver is activated. Alternatively, both the first transceiver and the second transceiver may be activated and the microcontroller may deactivate the first transceiver or the second transceiver based on the detected operation mode. The logic device is also programmed to conduct a diagnostic test on the peripheral device. In one embodiment, the diagnostic test is a logical diagnostic test. In another embodiment, the diagnostic test is a host scan. The logic device conducts the diagnostic test using the activated transceiver.

The logic device also preferably communicates with an user interface. The user interface communicates a result for the diagnostic test to a user. In one embodiment, the user interface comprises one or more Light Emitting Diodes (LEDs) that illuminate to communicate a result. The LEDs may for instance, flash to signal a code indicative of the result of the diagnostic test.

In certain embodiments, the apparatus comprises a user interface that communicates a result of a diagnostic test of a SCSI device. The user interface may include an input module and a user communication module. The input module may receive a result of a diagnostic test conducted by a test module that is connected by way of a terminated SCSI bus to the SCSI device. The test module is configured to communicate with the SCSI device using a plurality of operation modes. The user communication module communicates a representation of the result to the user.

The user communication module may include a visual display module that allows the user communication module to display a visual representation of the result to a user. Alternatively, the user communication module may include an audio module that plays an audio representation of the result to a user.

In one embodiment, a system is provided for testing a SCSI subsystem. The system includes a SCSI subsystem having at least one SCSI port. In one embodiment, the SCSI subsystem further comprises a peripheral device connected by an internal SCSI bus to the SCSI port. Other pass-through devices may also be connected to the SCSI port by way of the internal SCSI bus.

The system also preferably includes a tester that is connectable to the SCSI port. The tester is configured to communicate with the SCSI subsystem using a plurality of operation modes. The tester is also configured to conduct at least one diagnostic test on the SCSI subsystem and report a result for the diagnostic test to a user. Preferably, the SCSI subsystem is terminated. In one embodiment, the diagnostic test is a logical diagnostic test. In another embodiment, the diagnostic test comprises issuing a SCSI command to the SCSI subsystem.

In another aspect of the present invention, a method for testing a peripheral device is provided. The method includes connecting a tester to a terminated communication bus. The tester is configured to communicate over the communication bus with a peripheral device using a plurality of operation modes and conduct a diagnostic test on the peripheral device. Next, an operation mode for the peripheral device is detected, and a determination is made whether the operation mode of the peripheral device corresponds to the type of termination provided on the bus. Subsequently, the bus is scanned to determine a unique identifier for the peripheral device. A host scan is also preferably conducted using the unique identifier to test the integrity of each data line of the bus. In one embodiment, a logical command is issued to the peripheral device, and a response provided by the peripheral device is verified. Preferably, if any diagnostic test fails, a result identifying the error is reported to a user. Alternatively, as different diagnostic tests are conducted on the peripheral device, a result for each diagnostic test may be reported to a user.

The various elements and aspects of the present invention provide a novel apparatus, system, and method for testing a peripheral device. The peripheral is tested without physically removing the device. A logical diagnostic test is conducted, and the tester automatically adapts to the operation mode for the peripheral device. A terminated SCSI bus may also be tested using the present invention. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

It will be readily understood that the components of the present invention, as generally described and illustrated in the Figures herein, may be arranged and designed in a wide variety of different configurations. Thus, the following, more detailed, description of the embodiments of the apparatus, system, and method of the present invention, as represented in FIGS. 2 through 6, is not intended to limit the scope of the invention, as claimed, but is merely representative of selected embodiments of the invention.

The illustrated embodiments of the invention will be best understood by reference to the drawings, wherein like parts are designated by like numerals throughout. Those of ordinary skill in the art will, of course, appreciate that various modifications to the devices, systems and processes illustrated in FIGS. 2 through 6 may readily be made without departing from the essential characteristics of the invention. Thus, the following description is intended only by way of example, and simply illustrates certain selected embodiments of devices, systems, and processes that are consistent with the invention as claimed herein.

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
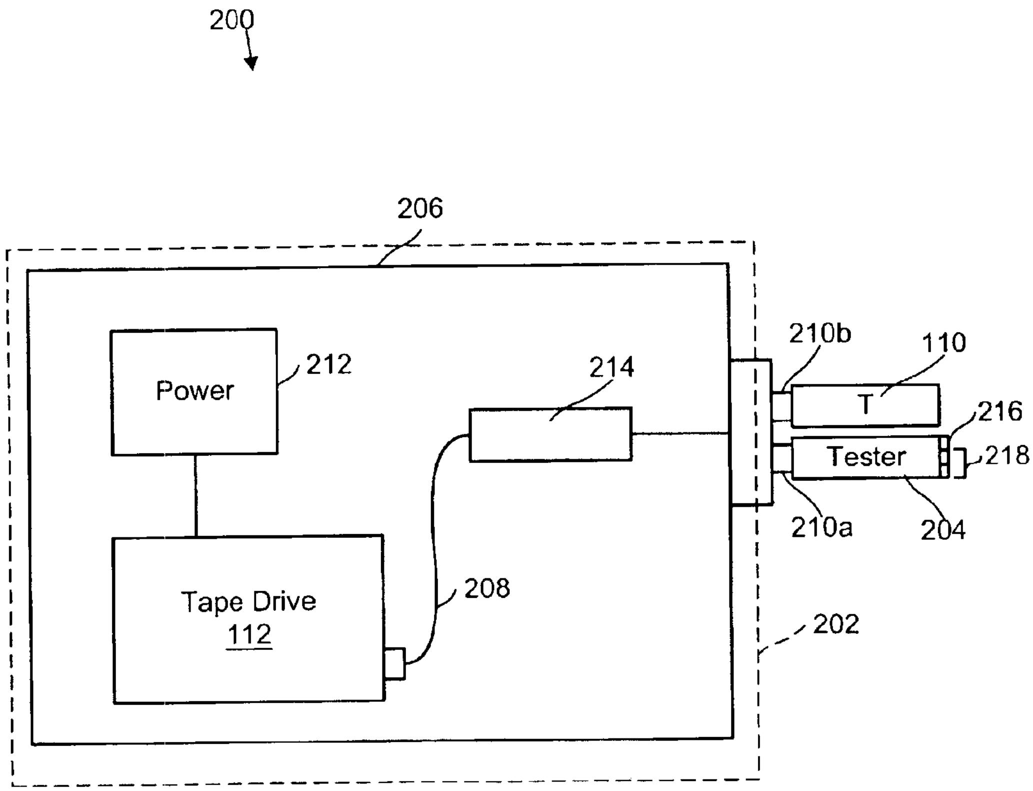
FIG. 2 is a block diagram illustrating a representative environment of a SCSI device that may be tested in accordance with the present invention.

FIG. 2 illustrates a system 200 according to one embodiment of the present invention. The system 200 includes a SCSI subsystem 202 and a tester 204. The system 200 allows diagnostic tests to be performed on the SCSI subsystem 202 without physically removing the SCSI subsystem 202.

A SCSI subsystem 202 refers to any set of components that are interconnected by a SCSI bus and include SCSI devices capable of communicating using the SCSI protocol. The SCSI subsystem 202 includes a housing 206 such as a canister. The housing 206 encloses the other components of the SCSI subsystem 202.

In FIG. 2, the SCSI subsystem 202 also includes a peripheral device such as a tape drive 112. Of course, other peripheral devices such as hard disks and the like may be included in addition to, or in place of the tape drive 112. Preferably, the peripheral device is a SCSI device including an internal controller (not shown) programmed to receive and respond to SCSI commands according to the SCSI protocol.

Figure 1:
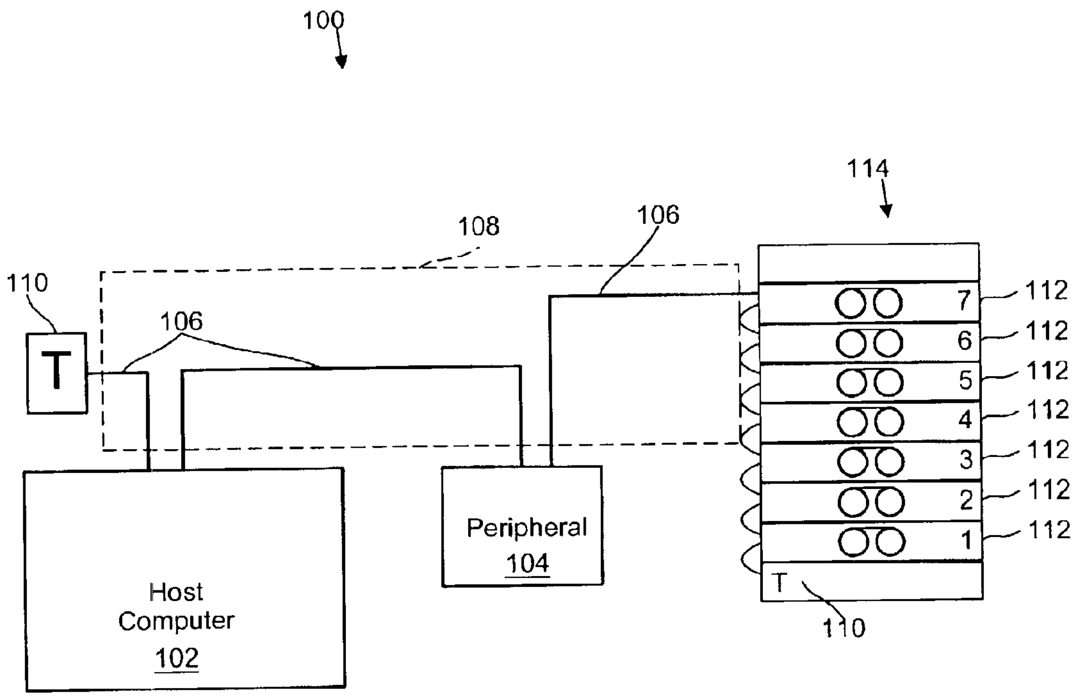
FIG. 1 is a block diagram illustrating a conventional SCSI system of the prior art.

Additionally, the SCSI subsystem 202 preferably includes an internal SCSI bus 208. The internal SCSI bus 208 is a SCSI cable that connects the tape drive 112 to a SCSI port 210. The SCSI port 210 provides an interface between the internal SCSI bus 208 and an external SCSI bus 108 (See FIG. 1). Alternatively, the SCSI port 210 may provide a direct interface to connect a SCSI device with and external bus 108. Preferably, the housing 206 includes two external SCSI ports 210*a*, 210*b* such that the SCSI subsystem 202 may be connected in-line within a SCSI system 100 (See FIG. 1).

In certain embodiments, the SCSI subsystem 202 includes additional components such as a power supply 212 and one or more pass-through devices 214. The pass-through device 214 may be connected to the internal SCSI bus 208 in a daisy-chain fashion. A pass-through device 214 provides additional benefits for the SCSI bus 108 but does not typically alter the SCSI signals. For example, the pass-through device 214 may comprise a card that boosts the power of the SCSI signals such that greater distances between SCSI devices are possible.

Alternatively, a SCSI subsystem 202 may comprise an isolated peripheral device such as a tape drive 112. For example, the tape drive 112 may comprise the only component in the housing 206. In other embodiments, the SCSI subsystem 202 comprises simply the peripheral device. In yet other embodiments, a SCSI subsystem 202 may include a SCSI backplane (not shown). A SCSI backplane is a plurality of SCSI slots that allow SCSI devices to be hot-swapped in and out from the slots. Each slot on the SCSI backplane may be configured with its own pre-assigned SCSI ID that is associated with any SCSI device that is inserted into the slot.

The SCSI bus 108, 208 does provide a limited amount of power by way of a wire known as TERMPWR. The amount of current available, however, is limited. Consequently, most SCSI subsystems 202 include a power supply 212 to provide power for the SCSI device, the tape drive 112.

Preferably, the system 200 allows for the SCSI subsystem 202 to be tested without requiring the housing 206 to be opened, or the tape drive 112 to be disconnected from the internal SCSI bus 208. In certain embodiments, the housing 206 in FIG. 2 is stacked to form a tape library 114 similar to that illustrated in FIG. 1. Preferably, each tape drive 112 of the tape library 114 may be tested using the external SCSI ports 210*a*, 210*b*.

The tester 204 provides an easy tool for conducting logical diagnostic tests on the SCSI subsystem 202. Preferably, the tester 204 is sized to be readily connectable to an external SCSI port 210*a*, 210*b*. The tester 204 functions as an initiator, as described above in relation to a SCSI system 100 (See FIG. 1). This means the tester 204 includes the logic to issue one or more SCSI commands to the SCSI subsystem 202.

To use the tester 204, the external SCSI ports 210*a*, 210*b* are disconnected from any terminator 110 or external SCSI bus 108. Next, the tester 204 is connected to one external SCSI port 210*a* and a terminator 110 is connected to the other external SCSI port 210*b*. The tester 204 requires minimal power and preferably draws power from the TERMPWR line on the internal SCSI bus 208. The tester 204 is configured to operate automatically in a plurality of operation modes. For example, if the SCSI subsystem 202 uses operation mode LVD/SE, the tester 204 also communicates over the internal SCSI bus 208 using the LVD/SE operation mode. Similarly, the tester 204 uses HVD as appropriate.

Preferably, an initial diagnostic test conducted by the tester 204 determines whether the SCSI subsystem 202 is properly terminated. The type of SCSI bus 208 should correspond to the type of terminator 110 connected to the external SCSI port 210*b*. The tester 204 determines proper termination by determining the voltage level of a DIFFSENSE line on the SCSI bus 208.

Based on the following table, the tester 204 determines what case exists for the SCSI subsystem 202:

TABLE 1

| Case | Bus Type | Terminator Type | "DIFFSENSE" Voltage |
|---|---|---|---|
| 1 | LVD | LVD | 1.3–1.5 |
| 2 | LVD | None | Ground |
| 3 | LVD | HVD | Ground |
| 4 | HVD | HVD | TERMPWR (5 volts) |
| 5 | HVD | None | TERMPWR (5 volts) |
| 6 | HVD | LVD | 3.6 |

The tester 204 requires that the SCSI bus 208 be terminated. If not, accurate determination of the proper case from the table above is not possible. Assuming an operator of the tester 204 has placed a terminator 110 on external SCSI port 210*b*, the tester 204 determines an error in termination in cases 3 and 6 because the operation modes do not match. If an error in termination is discovered, an operator may be instructed to confirm that the SCSI bus 208 is terminated and then the termination test may be repeated. In this manner, the test results are accurate, because the termination test is conducted with a terminator 110 connected to the SCSI bus 208. If an error in termination is discovered again, the operator may change the type of terminator 110 used and repeat the test. To facilitate repeated testing, the tester may include a reset button 216.

In certain embodiments, the tester 204 communicates the success or failure of a diagnostic test using LEDS 218. In one embodiment, the tester 204 includes a green LED 218 and a yellow LED 218. The yellow LED 218 may light when a test such as a termination check fails. The green LED 218 may flash a specific number of flashes to representing improper termination. In certain embodiments, once the tester 204 initializes, the green LED 218 may light if there is LVD termination and the yellow LED 218 may light if there is HVD termination. Of course, various lighting schemes for one or more LEDS may be used to communicate a variety of passed or failed diagnostic tests.

Without proper termination of the SCSI subsystem, conducting other diagnostic tests provides unreliable results. Consequently, if the tester 204 determines that the SCSI subsystem 202 is terminated by a terminator 110 having an operation mode compatible with the internal SCSI bus 208, the tester 204 may then conduct a series of other diagnostic tests, described in detail below.

The tester 204 can issue SCSI commands because it includes logic to function as an initiator. Consequently, the tester 204 may conduct a diagnostic test that requires issuing a SCSI command to the tape drive 112. For example, the tester 204 may issue an inquiry command. The inquiry command is a universal SCSI command that causes the SCSI device to report back basic information such as the name of its manufacturer, the version of SCSI supported by the SCSI device, and other similar information. The ability to issue a SCSI command and receive an expected response tests the logical operation of the tape drive 112 as well as the basic integrity of the internal SCSI bus 208.

Figure 3:
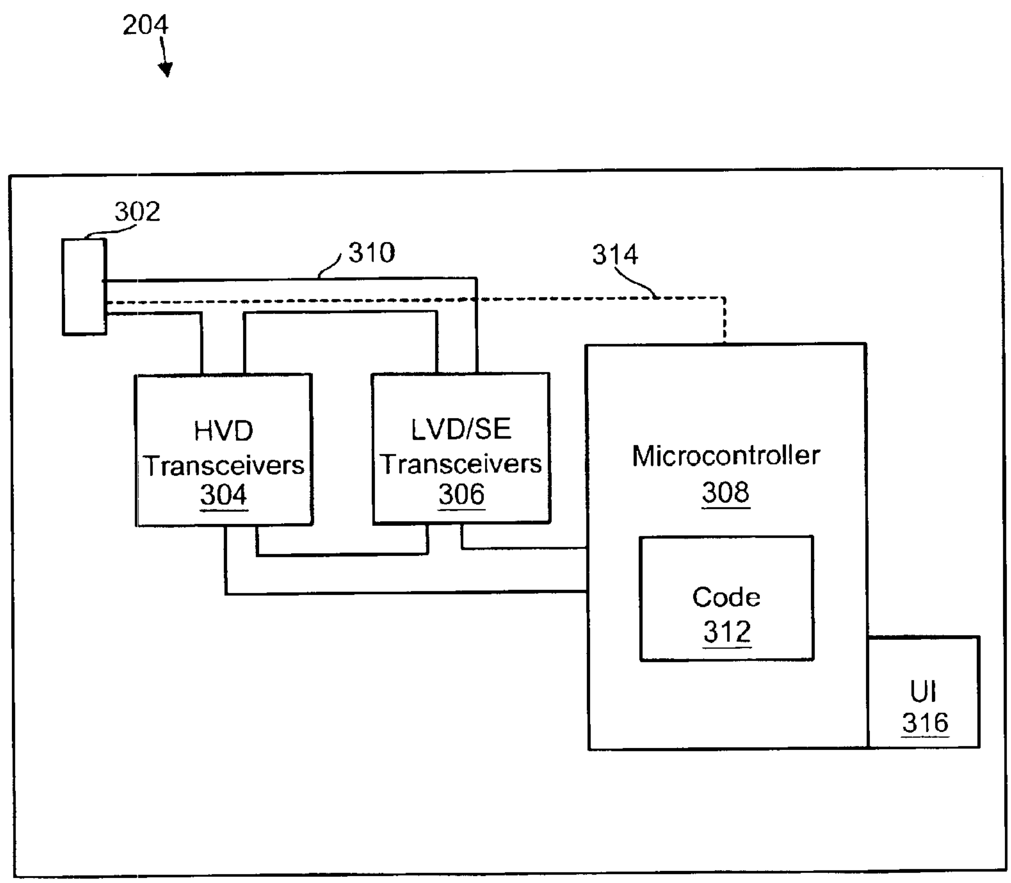
FIG. 3 is a block diagram illustrating one embodiment of a testing apparatus according to the present invention.

Referring now to FIG. 3, the internal components of one embodiment of a tester 204 are illustrated. The tester 204 includes a communication port 302 configured to be connected to a peripheral device. Preferably, the communication port 302 is connected directly to a SCSI port 210 for a peripheral device or a SCSI subsystem 202. The communication port 302 includes the same number of pins as conventional SCSI devices. Alternatively, an adapter may be used to allow the communication port 302 to properly interface with peripheral devices having a different number of pins.

The tester 204 also includes a first transceiver 304 and a second transceiver 306. Preferably, the first transceiver 304 is configured to send and receive signals through the communication port 302 according to a high-voltage operation mode (HVD). The second transceiver 306 is configured to send and receive signals through the communication port 302 using a low-voltage operation mode and a single-ended operation mode (LVD/SE).

The transceivers 304, 306 send and receive signals across the communication port 302. A representative example of a transceiver 304, 306 suitable for use with the present invention is the RS-422 transceiver, part no. DS75176BM, available from National Semiconductor of Santa Clara, Calif. Of course, a plurality of transceiver chips may be interconnected to function as a single transceiver 304, 306 capable of sending and receiving signals over the communication port 302 according to the HVD operation mode or the LVD/SE operation mode.

The tester 204 also includes a logic device. While the logic device may be any suitable device or combination of devices, including hardwired logic or application specific integrated circuits, in one embodiment the logic device comprises a microcontroller 308. The microcontroller 308 comprises the basic components of a computer, implemented on a single chip. Consequently, a microcontroller 308 includes a CPU, programmable memory such as an Electronically Erasable Programmable Read-only Memory (EEPROM), one or more Analog to Digital (A/D) signal converters, one or more Digital to Analog (D/A) signal converters, and one or more input and output ports. One representative example of a microcontroller 308 suitable for use with the present invention is the IC PIC16LF877, part no. PIC16LF877-04/PT, from Microchip of Chandler, Ariz.

Preferably, the microcontroller 308 is included in the tester 204. Of course the various components comprising a microcontroller 308 may be combined on a circuit board that accomplish the same function as the microcontroller 308. Nevertheless, the use of a microcontroller 308 allows the size and power requirements for the tester 204 to be minimized such that the tester 204 is portable and readily connectable to the SCSI port 210 of a peripheral device.

The first transceiver 304 and second transceiver 306 are shown connected to the communication port 302 by way of an internal SCSI bus 310. The internal SCSI bus 310 includes the appropriate number of wires to allow communication through the communication port 302 according to the LVD/SE or HVD operation mode. The purpose of the wires in the SCSI bus 310 changes based on the operation mode. Preferably, the first transceiver 304 is connected to the SCSI bus 310 to allow communication using the HVD operation mode and the second transceiver 306 is connected to the SCSI bus 310 to allow communication using the LVD/SE operation mode.

The microcontroller 308 includes executable code 312. The executable code 312 allows the microcontroller 308 to be programmed to perform the functions described above in relation to the tester 204. For example, the code 312 is programmed such that the microcontroller 308 detects the operation mode of a peripheral device connected by one or more SCSI buses 108 to the communication port 302.

The microcontroller 308 is preferably in electrical communication with both the first transceiver 304 and second transceiver 306. The microcontroller 308 is connected to the first transceiver 304 such that data and control information is sent and received through the first transceiver 304 according to the HVD operation mode. Similarly, the microcontroller 308 is connected to the second transceiver 306 such that data and control information may be sent and received according to the LVD/SE operation mode.

The microcontroller 308 is further connected to the first transceiver 304 and second transceiver 306 such that one transceiver 304, 306 is deactivated while the other transceiver 304, 306 is activated. Once the microcontroller 308 determines the proper operation mode, each communication from the microcontroller 308 passes through the first transceiver 304 or the second transceiver 306 such that the signals exit the communication port 302 according to the proper operation mode.

In one embodiment, the microcontroller 308 determines the operation mode of the peripheral device by conducting a termination test described above in relation to FIG. 2. Preferably, the DIFFSENSE line 314 of the internal SCSI bus 310 is connected directly to the microcontroller 308 by way of an A/D converter (not shown). Assuming the SCSI bus 108 connected to the SCSI device being tested is terminated according to the proper operation mode, the microcontroller 308 determines based on the voltage level on the DIFFSENSE line 314 the operation mode for the SCSI bus 108 because the termination type and bus type match. Table 1 provides one example of voltages that can be sensed on the DIFFSENSE line 314 and the corresponding cases. Of course, different systems may have different voltage levels, and indeed, cases other than those illustrated may be detected under the scope of the present invention.

Once the operation mode is determined, the microcontroller 308 may activate and/or deactivate the appropriate transceiver 304, 306. The first transceiver 304 or second transceiver 306 remains activated such that the microcontroller 308 communicates with the SCSI device being tested using the appropriate operation mode. The microcontroller 308 is further programmed to conduct one or more diagnostic tests on the SCSI device being tested.

As discussed above, one or more additional logic devices may be used in place of the microcontroller 308 to properly activate and deactivate the first transceiver 304 and the second transceiver 306. For example, a lattice, such as part no. ISPLSI2032E-110LT48 available from Lattice Semiconductor Corporation of Hillsboro, Oreg., may interconnect the microcontroller 308 and the first transceiver 304 and second transceiver 306. The lattice (not shown) may provide the functional equivalent of the microcontroller 308 discussed above in directing signals to pass through the first transceiver 304 or second transceiver 306 based on the operation mode. In addition, a microprocessor (not shown) may be used instead of the microcontroller 308 in certain embodiments.

The tester 204 also includes a user interface (UI) 316. The UI 316 is preferably connected to the output ports of the microcontroller 308. The microcontroller 308 communicates a result for one or more diagnostic tests to a user by way of the UI 316. As described above, the UI 316 may comprise LEDS 218 (See FIG. 2) programmed to light and/or flash to communicate the result. Of course, any medium capable of communicating with a user or another logic device may be used.

Figure 4:
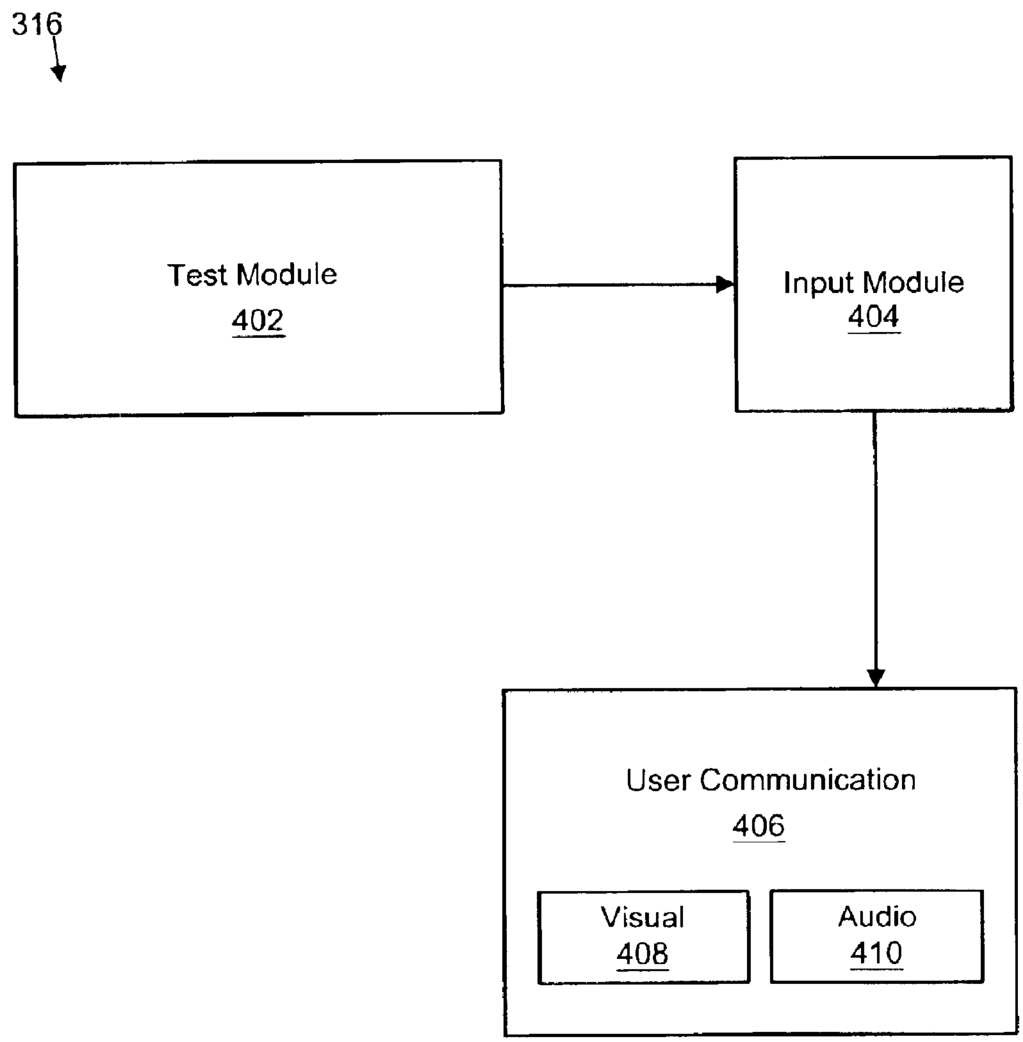
FIG. 4 is a block diagram illustrating one embodiment of a user interface according to the present invention.

FIG. 4 illustrates a user interface 316 according to one embodiment of the present invention. The user interface 316 includes a test module 402, an input module 404, and a user communication module 406. The test module 402 is connected by a terminated SCSI bus 108, 208, 310 to a SCSI device such as a tape drive 112. The test module 402 is configured to communicate with the SCSI device using a plurality of operation modes such as LVD/SE and HVD. The test module 402 conducts one or more diagnostic tests on the SCSI device. A result for the one or more diagnostic tests is communicated to the input module 404.

The input module 404 receives the result and passes the result to a user communication module 406. In certain embodiments, the input module 404 includes a button such as a reset button that allows a user to reset the test module 402 and repeat one or more diagnostic tests. Preferably, the diagnostic tests are logical diagnostic tests of the SCSI device.

The user communication module 406 communicates a representation of a result for one or more diagnostic tests to a user. The user communication module 406 may include a visual display module 408 and/or an audio module 410. In certain preferred embodiments, the user communication module 406 includes a visual display module 408 or an audio module 410.

The visual display module 408 may include a LCD display or other screen suitable to display a graphical or text message for a user. The text message may be an error code. Alternatively, the text message may be a description of the error condition. Of course, the text message may also communicate whether a diagnostic test succeeded, what the SCSI ID for the tested SCSI device is, and/or the SCSI operation mode for the SCSI device being tested.

The audio module 410 communicates an audio representation of a result for a diagnostic test to a user. Consequently, the audio module 410 may include a speaker. The audio representation may comprise a tune, a single tone, or other similar audio sound that indicates to a user whether a diagnostic test was successful.

Figure 5:
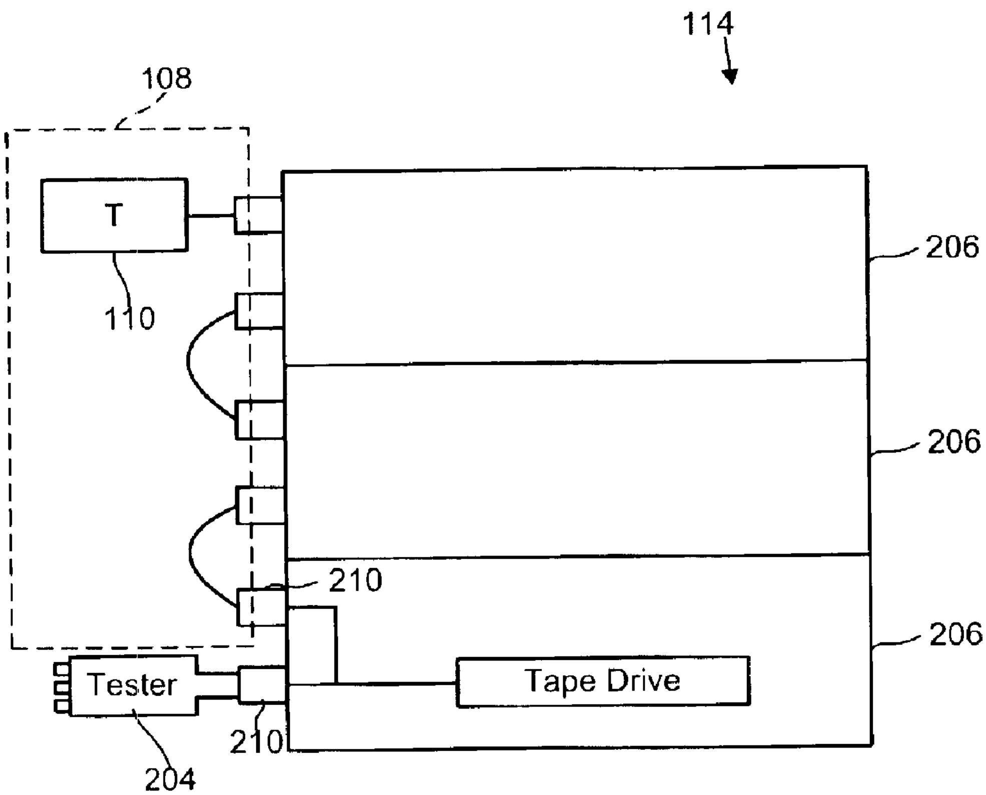
FIG. 5 is a block diagram representing one example of a manner of use of the present invention.

The SCSI protocol uses a SCSI bus 108 that allows for communication signals to pass along the bus 108 regardless of whether the SCSI devices connected to the bus 108 are powered or not. In FIG. 2, the tester 204 is directly connected to a SCSI subsystem 202 or a peripheral device. FIG. 5, illustrates, however, that the tester 204 may also be connected to a SCSI bus 108 that includes one powered peripheral.

The tester 204 conducts a termination test for the SCSI bus 108. Furthermore, as described below, the tester 204 conducts other logical diagnostic tests on the powered SCSI device. These logical diagnostic tests also test the integrity of an entire SCSI bus 108 connected to the SCSI device being tested.

For example, as illustrated in FIG. 5, suppose one tape drive 112 of a tape library 114 is to be tested. Normally, the tape library 114 includes three tape drives 112 connected in series to a host computer (not shown). To test one tape drive, one cable 106 may be disconnected from an external SCSI port 210. The tester 204 is connected in place of the cable 106. If the operator desires to test the integrity of the SCSI bus 108, the cables 106 for the existing SCSI bus 108 may remain connected, instead of connecting a terminator 110 to the other external SCSI port 210. All other SCSI devices on the SCSI bus 108 are turned off so that logical diagnostic tests conducted by the tester 204 are conducted on a single SCSI device being tested. In this manner, the existing SCSI bus 108, including terminators 110 is also being tested while logical diagnostic tests are performed. Preferably, the tester 204 first tests for proper termination and SCSI operation mode among the cables 106. If there is an operation mode mismatch in the cables or terminators 110, the tester 204 will report an error condition.

Figure 6:
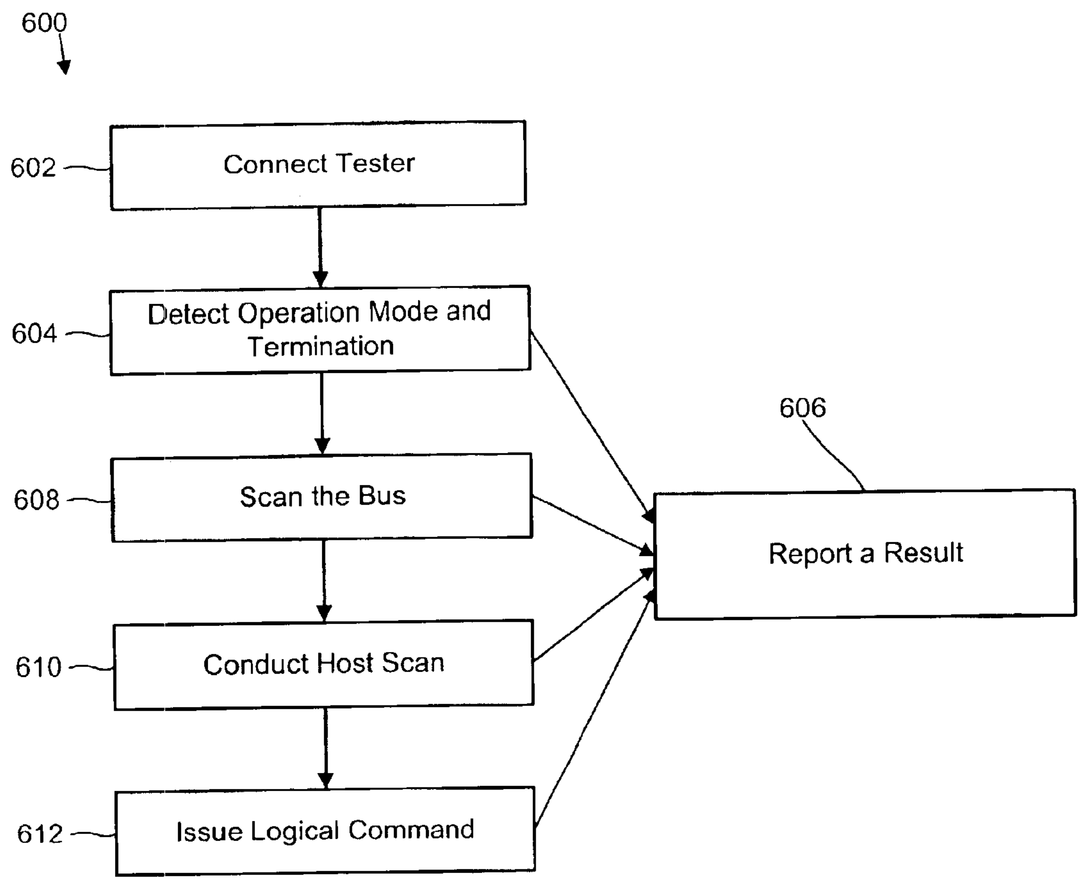
FIG. 6 is a flow chart illustrating a method for testing a peripheral device.

As mentioned above, the tester 204 in certain embodiments includes code 312 programmed to conduct one or more logical diagnostic tests on the SCSI device being tested and resident in the microcontroller 308 or other logic devices. FIG. 6 illustrates a method 600 according to one embodiment for testing a peripheral device. The method 600 may be implemented automatically and may employ the aforementioned program code 312 and the apparatus of FIGS. 2–5.

First, a tester 204 is connected 602 to the peripheral device or SCSI subsystem 202. As mentioned above, the tester 204 is preferably connected to an external readily-accessible SCSI port 210. Preferably, the tester 204 is connected to a terminated communication bus such as a terminated SCSI bus 108.

The tester 204 is configured to communicate with the peripheral device over the communication bus using a plurality of operation modes. As explained above, the tester detects 604 the operation mode for the communication bus based on the type of terminator 110 and the type of communication bus. Preferably, the operation mode is determine once proper termination is determined. In one embodiment, the tester 204 detects the voltage of a DIFFSENSE line on the communication bus to determines whether to communicate using LVD/SE or HVD operation modes.

In one embodiment, if a first attempt to determine the operation mode and termination status fails, a user may be directed to double check that a terminator 110 is connected to the communication bus. Then, the termination check may be done once again. If the termination check still fails or an operation mode mismatch is indicated, an error condition is reported 606 to a user.

In one embodiment, once an error condition is reported, the tester 204 may continue to report the error condition until a reset button 216 is pressed. Once a reset button is pressed the tester 204 resets and begins repeating the diagnostic tests. Preferably, termination and operation mode are checked first followed by the other tests described below.

Assuming that the SCSI bus 108 is terminated, the voltage of the DIFFSENSE line is used to determine operation mode compatibility between the SCSI bus 108 and the terminator 110 according to Table 1 above. If there is no operation mode mismatch, Table 1 also identifies the proper operation mode for the SCSI device and the SCSI bus 108.

One common error in a SCSI system is for two or more SCSI devices configured to use the same SCSI ID. If this is the case, when that SCSI ID is addressed by an initiator, multiple SCSI devices respond, this leads to contention on the SCSI bus and confusion of the initiator. Such confusion can lead to unexpected results.

Consequently, once the tester 204 determines the operation mode and adapts to use the proper operation mode, the tester 204 scans 608 the communication bus. Scanning the bus is a common diagnostic test that is often executed by a host computer 102 as part of an initialization phase and is commonly known as a "Selection phase."Scanning the bus is a polling technique in which the initiator, the tester 204, uses the SCSI ID that is commonly assigned to a host computer 102 such as SCSI ID 7 and attempts to contact each connected SCSI device, target.

First, the SCSI bus 108 is placed in a scanning state. The tester 204 raises each SCSI ID in turn. This is done by raising one data bit on the SCSI bus representing the SCSI ID of the initiator, SCSI ID 7, and then raising the data bit of each SCSI ID in turn. When the SCSI ID of the SCSI device being tested is raised, the SCSI device responds by raising a busy line. The bus scan continues for all the SCSI IDs. Preferably, there are sixteen addressable SCSI IDs, because conventional SCSI buses 108 have a sixteen bit bus. If the bus scan results in zero or more than one target device raising the busy line, then an error condition is reported 606.

In certain embodiments, the SCSI ID used for the tester 204 may be the same as that assigned to the SCSI device being tested. If that is the case, the SCSI device being tested does not raise the busy line because its SCSI ID has already been raised. Consequently, if no response was detected, to avoid a false bus scan result, the tester 204 is programmed to conduct the bus scan a second time, but the tester 204 selects a different SCSI ID for example, instead of SCSI ID 7, SCSI ID 6 may be used by the tester 204. Then, the SCSI device being tested will properly respond when SCSI ID 7 is polled.

While a bus scan should receive a response when the SCSI ID of the SCSI device being tested is raised, a failure to respond when the other data bits are raised may be due to a data line integrity problem. Consequently, the method 600 continues and conducts 610 a host scan. A host scan may be considered the inverse of a bus scan. At this point, the SCSI ID for the SCSI device being tested is known from the successful bus scan performed previously. In order to test the electrical and logical integrity of each data line, the tester 204 conducts another bus scan except that the tester 204 uses the SCSI ID of the SCSI device being tested.

For example, suppose the SCSI device being tested, the target, has a SCSI ID of 2. For a host scan, the tester 204 raises the 2 data bit and then in turn raises each other data bit. The target responds as though it is being hailed in a bus scan by initiators having every other SCSI ID but 2. To respond to a hail, the target raises the busy line. Each time data line 2 is raised, the target should raise the busy line because the target believes that a bus scan is being conducted. So, the tester 204 raises bits 2 and 0 and the target responds by raising the busy line. The tester 204 raises bits 2 and 1 and the target responds by raising the busy line. The tester 204 raises bit 2 but the same bit can not be raised twice simultaneously. Consequently, the target does not raise the busy line because according to the SCSI protocol two bits must be raised in a bus scan. No response, however, is appropriate because the initiator has selected the SCSI ID of the target.

The host scan continues for each data bit on the bus. If the target responds and raises the busy line for each SCSI ID in combination with its own, each of the data bits and the busy line are functioning properly and the target is responding logically. If the target fails to raise the busy line for one of the data bits other than the data bit corresponding to the target's SCSI ID, an error condition exists that is reported 606 to a user. The target may have failed to respond due to a short in the wire for a particular data bit. In this manner, the electrical and logical integrity of each data bit on the SCSI bus 108 is checked.

In addition to the data bus, a SCSI bus 108 includes control lines. Preferably, if the bus scan and host scan have been successfully completed, the tester 204 issues 612 a logical command to the target. The logical command is one example of a logical diagnostic test. In a preferred embodiment, the tester 204 issues 612 an inquiry command.

As mentioned above, an inquiry command is a universal SCSI command understood by all SCSI commands. In response to an inquiry command, the SCSI device in one embodiment sends information specific to the SCSI device. This information may include the name of the manufacturer of the device, the SCSI version supported, the SCSI ID, and other similar information. Preferably, the tester 204 is programmed to determine whether the target device properly transitions to the appropriate state(s) in response to an inquiry command. In addition, the tester 204 is preferably programmed to conduct a parity check for data provided in response to the inquiry command. Furthermore, the tester 204 determines whether the inquiry command was responded to with data of the proper size and format. If any of these characteristics of the response to the inquiry command is not what is expected, the tester 204 reports 606 that the logical command test failed.

Preferably, the tester 204 reports an error condition immediately following a diagnostic test that fails. If the diagnostic test is successful, the tester 204 continues to the next test. If all the tests are successful, the tester 204 may flash a SCSI ID for the SCSI device and then repeat the tests described above after a short delay until the tester 204 is disconnected from the peripheral device. Alternatively, the tester 204 may flash the SCSI ID for the peripheral until the tester 204 is reset.

The results reported by the apparatus, system, and method of the present invention may report an error condition, report a successful diagnostic test, or convey other information about the peripheral device being tested such as its SCSI ID. As described above, the manner in which the results are reported may be through a simple LED user interface. Alternatively, other communication means, including a more complicated text message interface may be used.

In one embodiment, the LEDs are illuminated based on the state of the microcontroller 308. The LEDS may communicate whether the tester 204 is properly powered, whether a test failed and an error code, whether a test is successful, and the SCSI ID for the peripheral device. For example, a green LED and yellow LED may be illuminated according to the following table.

TABLE 2

| Display Description | Green LED | Yellow LED |
|---|---|---|
| On - 'solid' | Device powered and initialized | Test failed |
| Off - 'solid' | No power, device error | |
| Numeric Flashing | Test Failed - Error code flashed | Test passed - flash SCSI ID |

In certain embodiments, once the device is initialized, the green LED or yellow LED may be lit to indicate whether the SCSI device is LVD/SE or HVD. Next, there may be a short delay before the LEDs begin flashing to indicate error codes or successful diagnostic tests.

Depending on the type of diagnostic test failure, a plurality error codes may be available. Preferably, only one error code is reported at a time. In one embodiment, the error codes are represented by flashes of a green LED according to the following table.

TABLE 3

| Error Code (number of flashes) | Error Description |
|---|---|
| 1 | No target device response; SCSI ID not set? |
| 2 | Multiple SCSI ID response |
| 3 | SCSI subsystem integrity error; error in SCSI data, parity, an internal SCSI bus, or the target device |
| 4 | Improper termination of the SCSI bus |

In summary, the present invention provides an apparatus, system, and method embodied in a portable tester that is readily connectable to a SCSI device connected to a SCSI bus. The tester automatically adapts to use the operation mode for the SCSI system. The tester also confirms whether the SCSI bus is terminated with the proper terminator. The SCSI device does not need to be physically removed from a housing to conduct the tests. Furthermore, the integrity of the SCSI bus is tested along with the SCSI device. The tester conducts a logical test to determine whether the SCSI device is functioning properly. The tester preferably includes an simple intuitive interface of LEDS. The tester allows for an accurate determination whether a SCSI device has actually failed before the SCSI device is removed from a housing and shipped to a manufacturer for repair.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for testing a peripheral device, the apparatus comprising:

a logic device configured to be connected to a communication port and programmed to detect an operation mode for a peripheral device in communication with the communication port, selectively activate one of a first transceiver and a second transceiver based on a detected operation mode, and perform a diagnostic test on the peripheral device using the activated transceiver; and a user interface configured to communicate with the logic device and indicate a result of the diagnostic test to a user.

2. The apparatus of claim 1, wherein the peripheral device is coupled to a terminator.

3. The apparatus of claim 1, wherein the diagnostic test comprises a logical diagnostic test.

4. The apparatus of claim 1, wherein the diagnostic test comprises a host scan.

5. The apparatus of claim 1, wherein the first transceiver is configured to operate using a high-voltage operation mode and the second transceiver is configured to operate using one of a low-voltage operation mode and a single-ended operation mode.

6. A system for testing a SCSI subsystem, the system comprising:

a SCSI subsystem having at least one SCSI port; and a tester connectable to the SCSI port, the tester configured to communicate with the SCSI subsystem using a plurality of operation modes, conduct at least one diagnostic test on the SCSI subsystem, and report a result for the diagnostic test, wherein the SCSI subsystem further comprises a pass-through device connected to the internal SCSI bus.

7. A method for testing a peripheral device, comprising:

connecting a tester to a terminated communication bus, the tester configured to communicate over the communication bus with a peripheral device using a plurality of operation modes and to conduct a diagnostic test on the peripheral device;

conducting the diagnostic test on the peripheral device using the tester; and reporting a result of the diagnostic test;

detecting an operation mode for the peripheral device and determining whether the operation mode of the peripheral device corresponds to the type of termination provided on the bus;

scanning the bus to determine a unique identifier for the peripheral device;

conducting a host scan of the bus using the unique identifier to test the integrity of each data line of the bus; and issuing a logical command to the peripheral device and verifying a response provided by the peripheral device.

8. An apparatus for testing a peripheral device, the apparatus comprising:

means for connecting a tester to a terminated communication bus, the tester configured to communicate over the communication bus with a peripheral device using a plurality of operation modes and conduct a diagnostic test on the peripheral device;

means for conducting the diagnostic test on the peripheral device using the tester; and means for reporting a result of the diagnostic test;

means for detecting an operation mode for the peripheral device and determining whether the operation mode of the peripheral device corresponds to the type of termination provided on the bus;

means for scanning the bus to determine a unique identifier for the peripheral device;

means for conducting a host scan of the bus using the unique identifier to test the integrity of each data line of the bus; and means for issuing a logical command to the peripheral device and verifying a response provided by the peripheral device.

9. An article of manufacture comprising a program storage medium readable by a processor and embodying one or more instructions executable by a processor to perform a method for testing a peripheral device installed on a terminated communication bus, the method comprising:

connecting a tester to a terminated communication bus, the tester configured to communicate over the communication bus with a peripheral device using a plurality of operation modes and to conduct a diagnostic test on the peripheral device;

conducting the diagnostic test on the peripheral device using the tester; and reporting a result of the diagnostic test;

detecting an operation mode for the peripheral device and determining whether the operation mode of the peripheral device corresponds to the type of termination provided on the bus;

scanning the bus to determine a unique identifier for the peripheral device;

conducting a host scan of the bus using the unique identifier to test the integrity of each data line of the bus; and issuing a logical command to the peripheral device and verifying a response provided by the peripheral device.

* * * * *